United States Patent
Wang et al.

(10) Patent No.: US 10,216,780 B2
(45) Date of Patent: *Feb. 26, 2019

(54) METHOD AND APPARATUS FOR TABLE AGING IN A NETWORK SWITCH

(71) Applicant: Cavium, Inc., San Jose, CA (US)

(72) Inventors: Weihuang Wang, Los Gatos, CA (US); Gerald Schmidt, San Jose, CA (US); Tsahi Daniel, Palo Alto, CA (US); Mohan Balan, Santa Clara, CA (US)

(73) Assignee: Cavium, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,336

(22) Filed: Aug. 11, 2017

(65) Prior Publication Data

US 2017/0364541 A1    Dec. 21, 2017

Related U.S. Application Data

(62) Division of application No. 14/289,548, filed on May 28, 2014, now Pat. No. 9,773,036.

(51) Int. Cl.
*G06F 17/30* (2006.01)
*G06F 12/1009* (2016.01)
*H04L 12/931* (2013.01)
*H04L 12/935* (2013.01)

(52) U.S. Cl.
CPC ........ *G06F 17/30339* (2013.01); *H04L 49/00* (2013.01); *H04L 49/309* (2013.01); *G06F 12/1009* (2013.01); *G06F 2212/1016* (2013.01); *G06F 2212/657* (2013.01)

(58) Field of Classification Search
CPC ....... G06F 17/30339; G06F 2212/1016; G06F 2212/657; G06F 12/1009
See application file for complete search history.

(56) References Cited

U.S. PATENT DOCUMENTS

| | | |
|---|---|---|
| 6,813,266 B1 | 11/2004 | Chiang |
| 6,993,033 B1 | 1/2006 | Williams |
| 7,194,573 B1 | 3/2007 | Saxtorph |
| 8,599,858 B1 * | 12/2013 | Mizrahi ............... H04L 45/026 370/395.31 |
| 2002/0133623 A1 * | 9/2002 | Lin .................... H04L 29/12009 709/242 |
| 2005/0102685 A1 | 5/2005 | Hariharan |
| 2011/0019679 A1 * | 1/2011 | Akahane ............... H04L 12/437 370/401 |
| 2013/0097345 A1 | 4/2013 | Munoz |
| 2013/0246698 A1 | 9/2013 | Estan |

* cited by examiner

*Primary Examiner* — Ann J Lo
*Assistant Examiner* — Michelle L Taeuber
(74) *Attorney, Agent, or Firm* — Haverstock & Owens LLP

(57) ABSTRACT

Embodiments of the present invention relate to a centralized table aging module that efficiently and flexibly utilizes an embedded memory resource, and that enables and facilitates separate network controllers. The centralized table aging module performs aging of tables in parallel using the embedded memory resource. The table aging module performs an age marking process and an age refreshing process. The memory resource includes age mark memory and age mask memory. Age marking is applied to the age mark memory. The age mask memory provides per-entry control granularity regarding the aging of table entries.

31 Claims, 4 Drawing Sheets

METHOD AND APPARATUS FOR TABLE AGING IN A NETWORK SWITCH

RELATED APPLICATIONS

This application is a divisional of U.S. patent application Ser. No. 14/289,548, filed on May 28, 2014, and entitled "METHOD AND APPARATUS FOR TABLE AGING IN A NETWORK SWITCH" which is also hereby incorporated by reference.

FIELD OF INVENTION

The present invention relates to table aging in a high speed network switch. More particularly, the present invention relates to method and apparatus for table aging in a network switch.

BACKGROUND OF THE INVENTION

Prior art network switches implement table aging. In particular, during a packet processing stage, a lookup is done at certain table. The matched entry in that table is tagged as hit. Entry hit information for all table entries are stored in memory. Either a periodic hardware or software process monitors the entry hit information. An action can be performed if a table entry has not been hit for a period of time. For example, aging of MAC addresses is used to evict and update forwarding table entries. In some other cases, this mechanism can be used for network debugging.

Prior art network switches allocate a fixed set of memory that is used to age out a fixed set of tables. In modern system-on-chip (SOC) designs, area and power budget of embedded memory usually dominates the entire chip budget. As a result, it is critical to efficiently and flexibly utilize the limited memory resources.

Software defined networking (SDN) has emerged as a disruptive innovation to the industry. It advocates separation of control plane and high-speed data plane of network equipment. Control of the network, such as flow management, route update, table aging, is traditionally done in a specialized hardware switch chip. However, in the new era of SDN, these complicated functions are moved into separate controller. Such changes call for a new and different approach for architecture and implementation of the data plane, most notably, network switch chips.

BRIEF SUMMARY OF THE INVENTION

Embodiments of the present invention relate to a centralized table aging module that efficiently and flexibly utilizes an embedded memory resource, and that enables and facilitates separate network controllers. The centralized table aging module performs aging of tables in parallel using the embedded memory resource. The table aging module performs an age marking process and an age refreshing process. The memory resource includes age mark memory and age mask memory. Age marking is applied to the age mark memory. The age mask memory provides per-entry control granularity regarding the aging of table entries.

In one aspect, a network switch is provided. The network switch includes at least one core that includes a plurality of processing units. The network switch also includes an on-chip memory that stores a plurality of search tables. The plurality of processing units communicates with the on-chip memory to perform table searching. The network switch also includes a table aging module that includes its own embedded memory. The table aging module is able to age any of the plurality of search tables. In some embodiments, once there is a search table hit, the table aging module receives a Table ID and a hit address from a corresponding search request.

In some embodiments, the table aging module performs an age marking process and an age refreshing process. The age marking process sets an age memory bit as marked (e.g., to 1) every time a corresponding search table hit occurs. The age refreshing process examines all age memory bits corresponding to the search tables. The examination occurs either periodically based on a configured cycle time or is specifically triggered by software. When an age memory bit is unmarked (e.g., 0), software is notified that a respective table entry is stale, and when the age memory bit is marked (e.g., 1), the age memory bit is reset as unmarked (e.g., 0) in preparation for next round of age marking and age refreshing.

In some embodiments, the network also includes an aging configurations set that is used by the table aging module. The aging configurations set includes configurations, age profiles and a central aging memory pool.

In some embodiments, each of the plurality of search tables is in one of the aging configurations and includes an aging enable bit and a pointer into one of the age profiles.

In some embodiments, each of the age profiles specifies a refresh time period for a search table and specifies an aging memory allocation in the central aging memory pool. The central aging memory pool is embedded. Alternatively, the central aging memory pool is a part of the on-chip memory.

In some embodiments, the central aging memory pool includes age mark memory and age mask memory. In some embodiments, each of the age mark memory and the age mask memory contains multiple physical memory tiles, wherein memories of the central aging memory pool are group into tiles. Age marking is applied to the age mark memory. The age mask memory provides per-entry control granularity, wherein when a mask bit is set to 0, a corresponding table entry does not participate in an aging process.

In another aspect, a table aging module in a network switch is provided. The table aging module includes aging memory tiles. The aging memory tiles typically includes age mark memory and age mask memory.

The table aging module also includes an age marking process. The age marking process typically includes an input queue for buffering age marking inputs for table hits to the aging memory tiles.

The table aging module also includes an age refreshing process. The age refreshing process typically includes a bit-wise OR operation of a read-out age mark data in the age mark memory with the inverse of a mask bit in the age mask memory.

In some embodiments, the table aging module also includes an age interrupt queue. When the result of the operation is not all 1's, the result and memory tile address and row address for an aging memory row, which corresponds to a set of search table entries, are pushed into the age interrupt queue.

In some embodiments, the table aging module also includes a refresh state machine for controlling the age refreshing process.

In yet another aspect, a method of a network switch is provided. The method includes parallel processing multiple table search requests. The method also includes, upon a table hit, generating information for processing by a table aging module. The method also includes the table aging module performing aging of tables in parallel using a central aging memory pool. The table aging module uses the generated information to perform the aging of tables.

In some embodiments, the aging of tables involves two separate processes including an age marking process and an age refreshing process. In some embodiments, the age refreshing process can be paused.

In some embodiments, the method also includes, prior to parallel processing multiple table search requests programmably assigning a first subset of the tiles as an age mark memory, programmably assigning a second subset of the tiles as an age mask memory, and programmably configuring the table aging module.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention relate to a centralized table aging module that efficiently and flexibly utilizes an embedded memory resource, and that enables and facilitates separate network controllers. The centralized table aging module performs aging of tables in parallel using the embedded memory resource. The table aging module performs an age marking process and an age refreshing process. The memory resource includes age mark memory and age mask memory. Age marking is applied to the age mark memory. The age mask memory provides per-entry control granularity regarding the aging of table entries.

Figure 1:
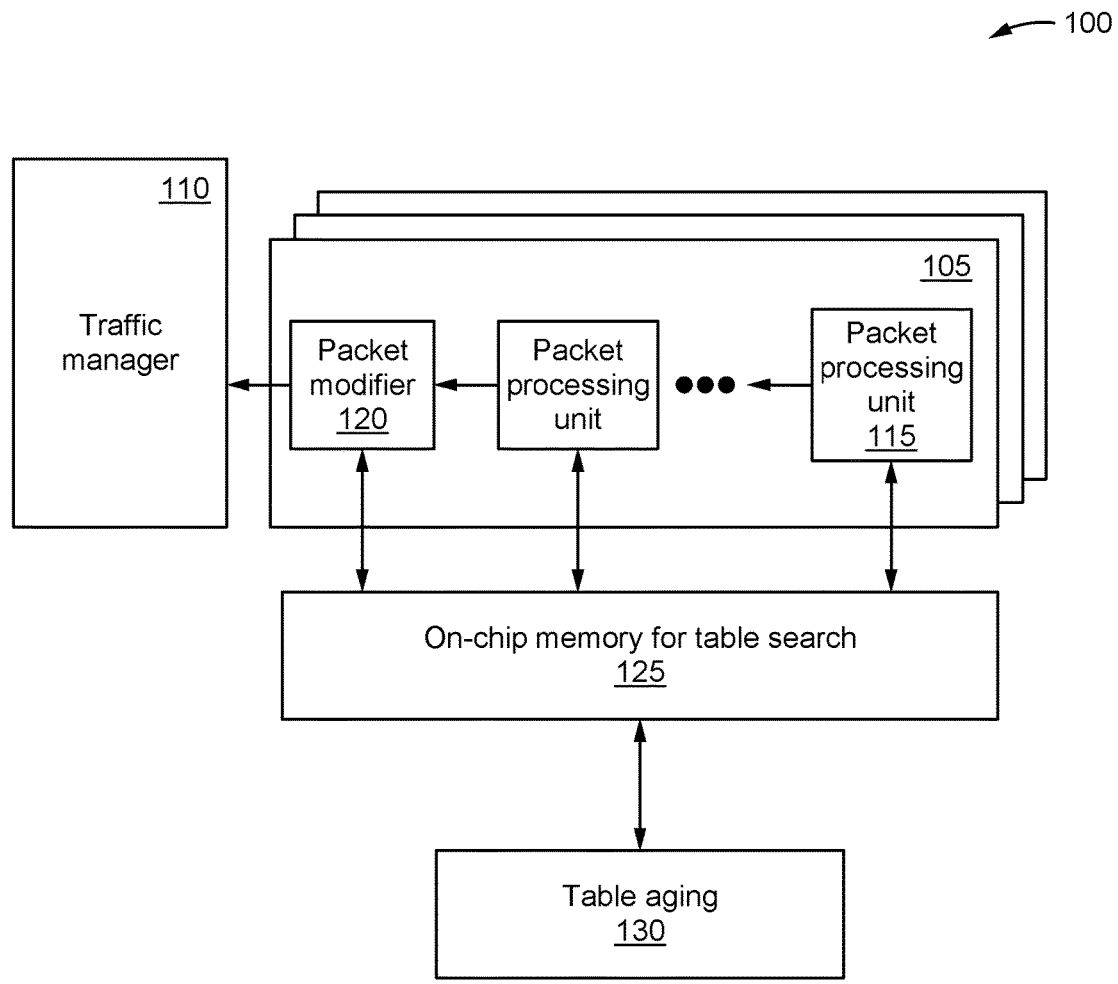
FIG. 1 illustrates an exemplary aspect of a network switch according to an embodiment of the present invention.

FIG. 1 illustrates an exemplary aspect of a network switch 100 according to an embodiment of the present invention. The network switch 100 includes one or more cores 105 and a traffic manager 110. Each core 105 typically includes a plurality of pipeline stages. The plurality of pipeline stages includes a plurality of packet processing units 115 and at least one packet modifier 120. All processing units 115, 120 in the one or more cores 105 communicate with an on-chip memory 125 to perform table searching. The on-chip memory 125 can store one or more search tables. A search table is either aging enabled or aging disabled. Each of the plurality of packet processing units 115 is able to access the one or more search tables.

The on-chip memory 125 is coupled with a table aging module 130. The table aging module 130 includes its own embedded memory. The embedded memory typically works behind the on-chip memory 125 that is used for table searching. The embedded memory can be utilized to age any search table in the table search memory pool 125. Typically, once there is a search table hit, the aging module 130 of FIG. 1 receives a Table ID and a hit address from the corresponding search request.

The table aging module 130 performs at least two separate processes, including an age marking process and an age refreshing process. For those search tables that are configured as aging enabled, there are memory bits in the embedded memory of the table aging module 130 corresponding to each table entry. The age marking process sets an age memory bit to 1 every time a corresponding search table hit occurs. Either periodically based on configured cycle time (i.e., automatic aging mode) or specifically triggered by software (i.e., triggered mode), the age refreshing process examines all age memory bits corresponding to the search tables. If the age memory bit is 0, meaning that the respective table entry has not been hit since the previous aging refreshing process, then software is notified that that respective table entry is stale. If the age memory bit is 1, meaning that the respective table entry is active, then the age memory bit is reset to 0 in preparation for next round of age marking and age refreshing.

There are typically many search tables in a feature-rich network switch, such as the network switch 100. For example, there can be more than 160 search tables for the entire SOC chip of the network switch 100. Exemplary search tables include but are not limited to a routing table, an access control list (ACL), a flow table and the like. Directly aging the 160 or more search tables can be too much for the SOC chip to handle at one time and of less practical use.

Figure 2:
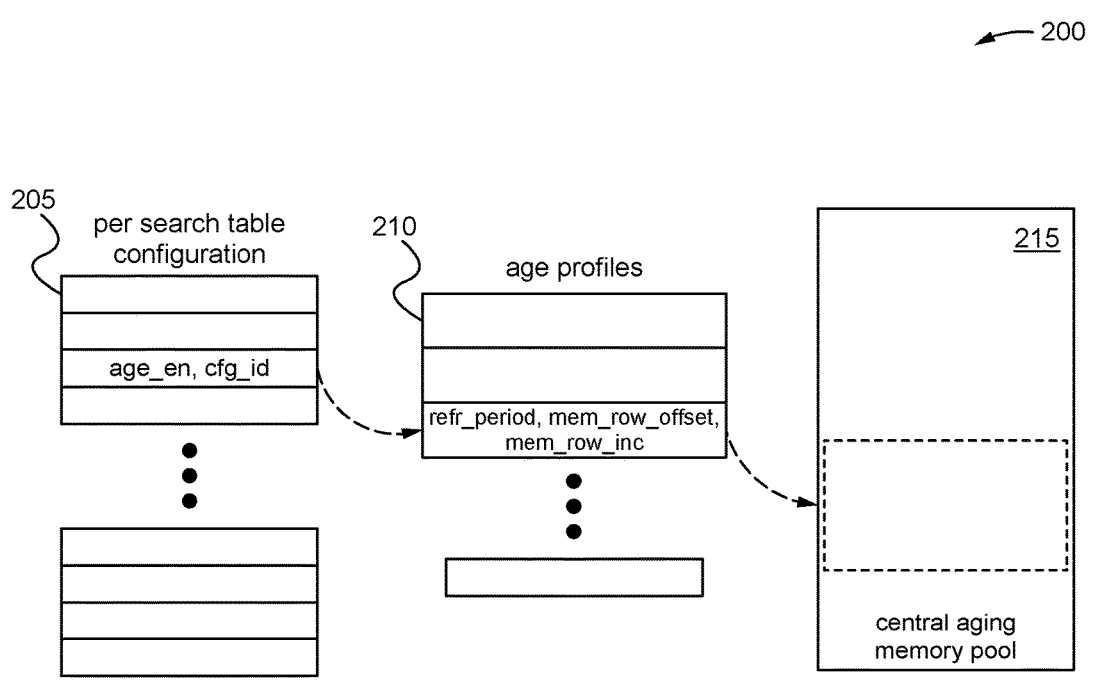
FIG. 2 illustrates an aging configurations set according to an embodiment of the present invention.

FIG. 2 illustrates an aging configurations set 200 according to an embodiment of the present invention. In some embodiments, the aging configurations set 200 is used by the table aging module 130 of FIG. 1. The aging configurations set 200 includes configurations 205, age profiles 210 and a central aging memory pool 215.

In some embodiments, 64 age profiles 210 are provided for more than 160 search tables. However, more or less age profiles can be provided. Each of the search tables, which is in one of the aging configurations 205, includes an aging enable bit (i.e., age_en) and a pointer (i.e., cfg_id) into one of the 64 age profiles 210. The age_en indicates weather the search table is aging enabled.

Each age profile 210 specifies a refresh time period (i.e., refr_period) for the search table. The refresh time period advantageously allows for different aging granularity for flexibility in the higher level system. For example, a MAC table entry can be aged out after a few minutes of inactivity. For another example, a flow table entry can be declared inactive after a few seconds. The age profile also specifies aging memory allocation (i.e., mem_row_offset, mem_row_inc) in the central aging memory pool 215.

In some embodiments, the table aging module 130 of FIG. 1 uses a centralized common memory pool. The aging memory pool 215 of FIG. 2 is a part of the centralized common memory pool. In some embodiments, the centralized common memory pool is embedded. Alternatively, the centralized common memory pool is a part of the on-chip memory 125 of FIG. 1.

In some embodiments, each table search request specifies whether or not that particular search should participate in the aging process, even if the corresponding search table is age enabled. One example of this flexibility is aging of a MAC table. Typically, there is only one table for MAC address lookup. The source MAC address look up may want to participate in the aging process. However, the destination MAC address look up may not want to participate in the aging process because the destination may have already moved away from the current destination port without the network switch yet having this knowledge.

Figure 3:
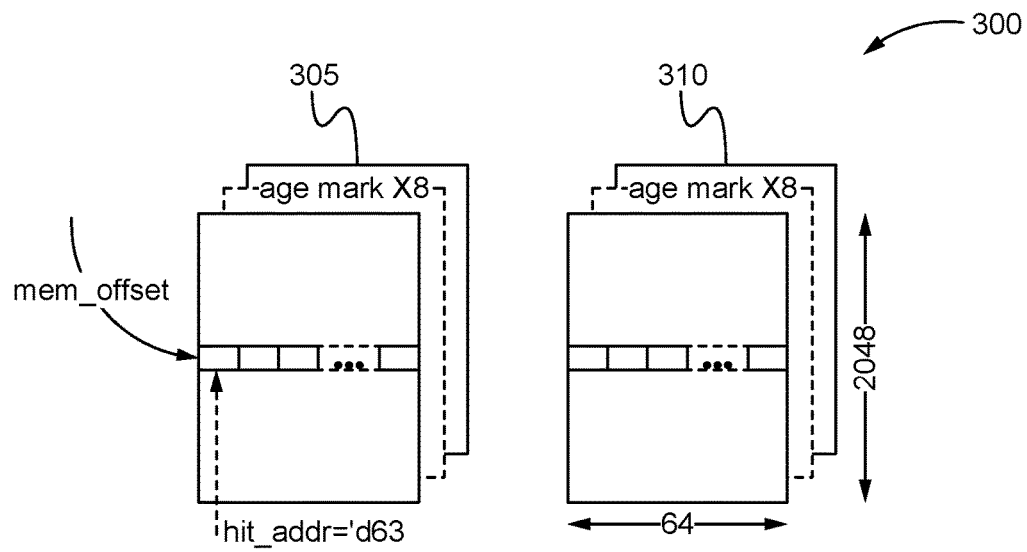
FIG. 3 illustrates an exemplary central aging memory pool according to an embodiment of the present invention.

FIG. 3 illustrates an exemplary central aging memory pool 300 according to an embodiment of the present invention. In some embodiments, the central aging memory pool 215 of FIG. 2 is similarly configured as the central aging memory pool 300. The central aging memory pool 300 includes age mark memory 305 and age mask memory 310, each of which contains multiple physical memory tiles. In some embodiments, the memories of the memory pool 300 are grouped into tiles. The tiles typically contain the same number of memories. In some embodiments, each tile is 64-bit wide and 2048-entry deep. As shown in FIG. 3, eight memory tiles are used to construct each of the age mark memory 305 and the age mask memory 310. However, each of the age mark memory 305 and the age mask memory 310 can be constructed with more or less memory tiles. The number of memory tiles for the age mark memory 305 can be the same as or different from the number of memory tiles for the age mask memory 310.

Age marking is applied to the age mark memory 305, as described above. The age mask memory 310 provides per-entry control granularity. If a mask bit is set to 0, then the corresponding table entry does not participate in the aging process. The per-entry control granularity provides numerous benefits. For example, a system would like to remove any stale entries in a routing table. However, there might be some routing entries that are statically configured that should never be evicted.

Figure 4:
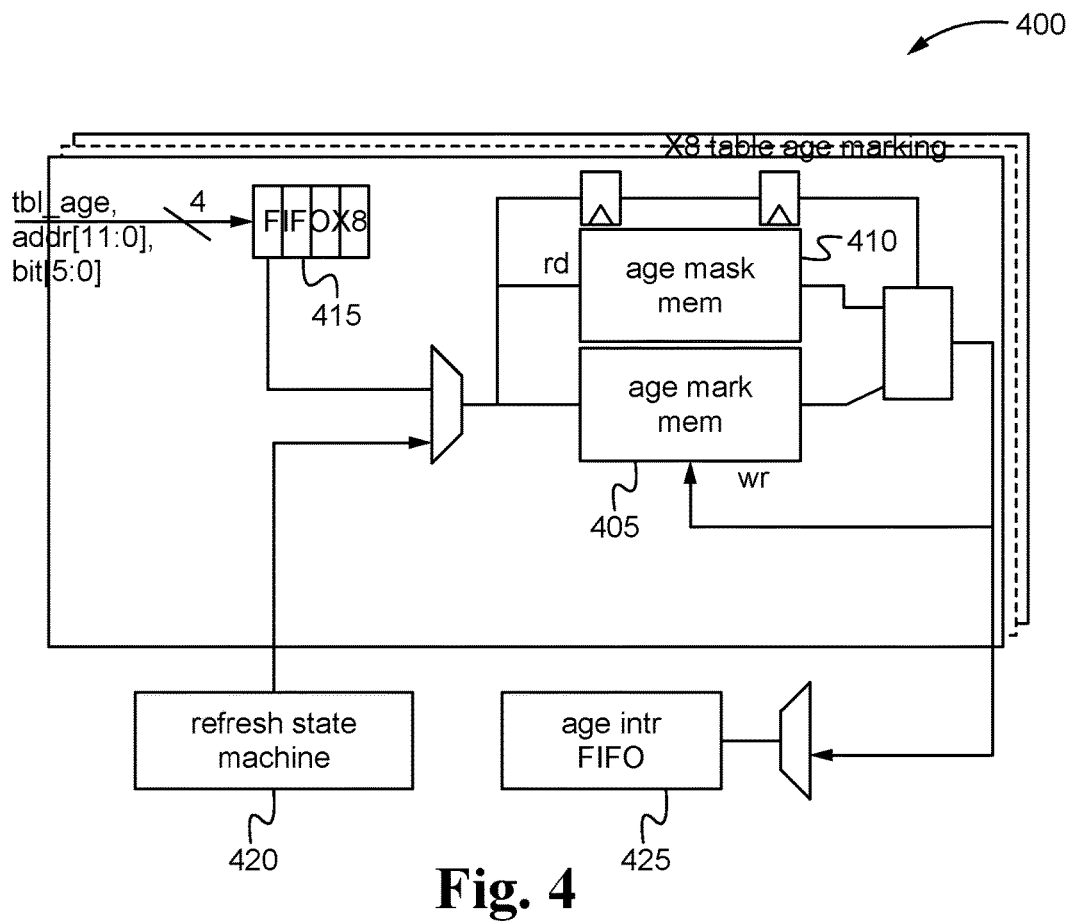
FIG. 4 illustrates a block diagram of a table aging module according to an embodiment of the present invention.

FIG. 4 illustrates a block diagram of a table aging module 400 according to an embodiment of the present invention. In some embodiments, the table aging module 130 of FIG. 1 is similarly configured as the table aging module 400. The table aging module 400 allows for the parallel processing of table aging.

During the age marking process, age marking inputs for table hits to aging memory tiles 405, 410 are buffered in an input queue 415, which can be a FIFO buffer, in case of aging memory oversubscription. Software can configure the aging process to match perfectly with the bandwidth of the age mark memory 405, which means that only a few tables will be aged. Alternatively, software can configure the aging process to configure many tables to be aged. However, it is possible that not all table hits will be marked, in which marking will become probabilistic. The age marking inputs for each table hit includes Table ID (i.e., tbl age) and a table hit address. The table hit address is used to map to exactly one bit in one row of the corresponding age mark memory 405.

During the age refreshing process, the read-out age mark data in the age mark memory 405 is bit-wise OR-ed with the inverse of the mask bit in the age mask memory 410. If the result is all 1's, then each of the entries has been hit during the past refresh. However, if the result is not all 1's, then there are one or more entries that have not been hit during the past refresh event. The age mark memory tile address and row address, as well as the OR-ed data, are pushed into an age interrupt queue 425, which can be a FIFO buffer. An interrupt is then sent to a CPU, such as an external system CPU, for eviction purposes, network debugging purposes and/or other purposes.

A refresh state machine 420 typically controls the age refreshing process. Table 1 lists configurations of the refresh state machine 420.

TABLE 1

| Field | Width | Description |
|---|---|---|
| mode | 1 | Automatic aging mode or triggered mode |
| trig_cfg_bmp | 64 | If it is in triggered mode, which of the 64 age profiles will do refresh |
| en_pause | 1 | If set, age refresh process will pause when age interrupt FIFO occupancy exceeds the configured threshold, as below |
| fifo_thd | 6 | |
| unit_time | 32 | All aging events are time based on number of unit_time clock cycles |

The mode of the aging unit (i.e., automatic aging mode or triggered mode) is specified by the mode field. The unit_time field defines the number of clock cycles aging events are based off of.

If the aging unit is in the automatic aging mode, then the age refreshing process periodically examines all age memory bits corresponding to the search tables based on the configured cycle time.

If the aging unit is in the triggered mode, then the trig_cfg_bmp field indicates which of the 64 age profiles will do the age refreshing process upon a system CPU write.

Typically, the hardware aging process runs orders of magnitude faster than the software in the CPU, the age interrupt queue 425 could easily overflow. Based on the en_pause field, the refreshing process can pause once the age interrupt queue 425 occupancy level exceeds certain configured threshold, as set by the fifo_thd field. The age refreshing process typically pauses until the CPU drains the age interrupt queue 425 below the configured threshold.

Due to limited memory bandwidth or processing rate, not all table hits may be marked in a certain aging configuration, which can result in a false aging alarm. However, due to the nature of network traffic, most active flows will have more than one packet going through the switch. So, even if one packet misses the age marking process, it is unlikely that all packets will miss the age marking process, especially if the aging refresh cycle is reasonably long enough, which is the case for practical use cases. Furthermore, this hardware architecture enables software to implement different table aging mechanisms in higher level applications, such as aging with age counters of more than 1-bit width.

Figure 5:
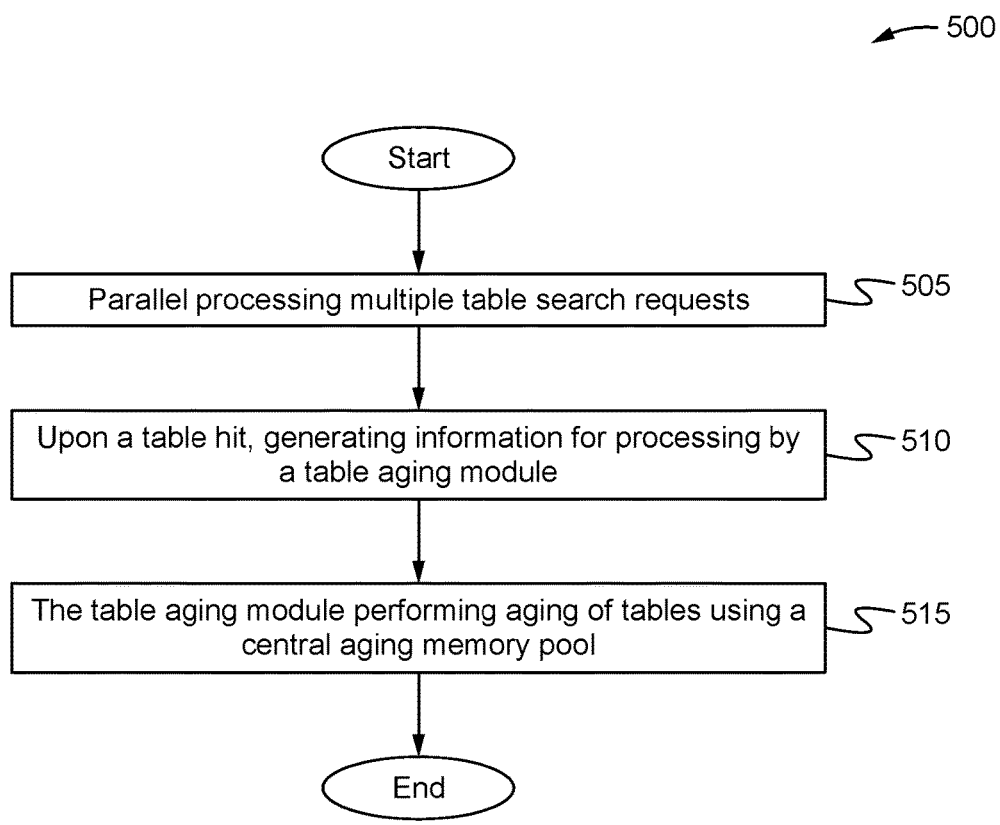
FIG. 5 illustrates a method of aging according to an embodiment of the present invention.

FIG. 5 illustrates a method of aging 500 according to an embodiment of the present invention. The method 500 is typically performed by the network switch 100 of FIG. 1. As discussed above, the network switch 100 includes the on-chip memory 125. The plurality of packet processing units 115 communicates with the on-chip memory 125 to perform table searching.

At a step 505, multiple table search requests are processed in parallel.

At a step 510, upon a table hit, information is generated for processing by a table aging module.

At a step 515, the table aging module performs aging of tables in parallel using a central aging memory pool. The table aging module typically uses the generated information to perform the aging of tables. As discussed above, the aging of tables involves two separate processes, including an age marking process and an age refreshing process. The central aging memory pool includes an age mark memory and an age mask memory.

The age marking process includes an input queue for buffering age marking inputs for table hits to the aging memory tiles, while the age refreshing process includes a bit-wise OR operation of a read-out age mark data in the age mark memory with the inverse of a mask bit in the age mask memory. If the result is all 1's, then each of the entries has been hit during the past refresh or needs to be saved. However, if the result is not all 1's, then there are one or more entries that have not been hit during the past refresh event. The memory tile address and row address for those routing entries, as well as the OR-ed data are pushed into an age interrupt queue. An interrupt is then sent to a CPU, such as an external system CPU, for eviction purposes, network debugging purposes and/or other purposes. In some embodiments, the age refreshing process can be paused to prevent overflow of the age interrupt queue.

In some embodiments, the method 500 also includes, prior to parallel processing multiple table search requests at the step 505 programmably assigning a first subset of the tiles as an age mark memory, programmably assigning a second subset of the tiles as an age mask memory, and programmably configuring the table aging module. Unlike prior art networking switches that uses dedicated memory for table aging, the network switch 100 uses a centralized table aging module that efficiently and flexibly uses embedded memory resource for table aging.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A table aging module in a network switch, the table aging module comprising:
   aging memory tiles including age mark memory including age memory bit values and age mask memory including mask bit values for each entry of a plurality of search tables, wherein each of the age memory bit values indicate whether a corresponding one of the entries has been subject to a search hit since a previous aging process; and
   a processing circuit that determines if a request aging indicator of a table search request indicates that aging is disabled for the table search request, wherein at least one of the entries is hit by the table search request and refrains from updating the age memory bit values of the at least one of the entries when the request aging indicator indicates that aging is disabled for the table search request even if an aging configuration indicator value of the search table storing the at least one of the entries indicates that aging is enabled.

2. The table aging module of claim 1, further comprising an input queue for buffering age marking inputs for table hits to the aging memory tiles in an age marking process performed by the processing circuit.

3. The table aging module of claim 2, wherein the processing circuit performs an age refreshing process including a bit-wise OR operation of a read-out age mark data in the age mark memory with the inverse of a mask bit in the age mask memory.

4. The table aging module of claim 3, further comprising an age interrupt queue.

5. The table aging module of claim 4, wherein when the result of the operation is not all a same value, the result and memory tile address and row address for an aging memory row, which corresponds to a set of search table entries, are pushed into the age interrupt queue.

6. The table aging module of claim 3, further comprising a refresh state machine for controlling the age refreshing process.

7. A non-transitory computer-readable medium storing a table aging module, the table aging module including both mask bit values and an age memory bit value for each entry of each of a plurality of search tables in a central aging memory pool, wherein each of the age memory bit values indicate whether a corresponding one of the entries has been subject to a search hit since a previous aging process, wherein the table aging module:
   determines if a request aging indicator of a table search request indicates that aging is disabled for the table search request, wherein at least one of the entries is hit by the table search request; and
   refrains from updating the age memory bit values of the at least one of the entries when the request aging indicator indicates that aging is disabled for the table search request even if an aging configuration indicator value of the search table storing the at least one of the entries indicates that aging is enabled.

8. The non-transitory computer-readable medium of claim 7, wherein the table aging module includes aging memory tiles apportioned into age mark memory and age mask memory.

9. The non-transitory computer-readable medium of claim 8, wherein the table aging module performs an age marking process using an input queue for buffering age marking inputs for table hits to the aging memory tiles.

10. The non-transitory computer-readable medium of claim 9, wherein the table aging module performs an age refreshing process including a bit-wise OR operation of a read-out age mark data in the age mark memory with the inverse of a mask bit in the age mask memory.

11. The non-transitory computer-readable medium of claim 10, wherein the table aging module includes an age interrupt queue.

12. The non-transitory computer-readable medium of claim 11, wherein when a result of the bit-wise OR operation is not all a same value, the table aging module pushes the result and memory tile address and row address for an aging memory row that corresponds to a set of the entries, into the age interrupt queue.

13. The non-transitory computer-readable medium of claim 12, wherein the table aging module includes a refresh state machine for controlling the age refreshing process.

14. The non-transitory computer-readable medium of claim 13, wherein the age refreshing process examines all age memory bits corresponding to the plurality of search tables.

15. The non-transitory computer-readable medium of claim 14, wherein the examination occurs periodically based on a configured cycle time or is specifically triggered by software.

16. The non-transitory computer-readable medium of claim 15, wherein when an age memory bit is unmarked, software is notified that a respective table entry is stale, and when the age memory bit is marked, the age memory bit is reset as unmarked in preparation for next round of age marking and age refreshing.

17. The non-transitory computer-readable medium of claim 16, wherein the table aging module identifies both the mask bit value of one or more of the entries and the aging configuration indicator value of the search table storing the one or more of the entries.

18. The non-transitory computer-readable medium of claim 17, wherein the table aging module, based on both the aging configuration indicator value of the search table storing the one or more of the entries and the mask bit values of the one or more of the entries, refrains from aging the one or more of the entries, regardless of the age memory bit values of the one or more entries, if the aging configuration indicator value of the search table storing the one or more of the entries indicates that the search table storing the one or more of the entries should be aged, but the mask bit values indicate that the one or more of the entries should not be aged.

19. A table aging module in a network switch, the table aging module comprising:
   mask bit values and an age memory bit value for each entry of each of a plurality of search tables in a central aging memory pool, wherein each of the age memory bit values indicate whether a corresponding one of the entries has been subject to a search hit since a previous aging process;
   means for determining if a request aging indicator of a table search request indicates that aging is disabled for the table search request, wherein at least one of the entries is hit by the table search request; and
   means for refraining from updating the age memory bit values of the at least one of the entries when the request aging indicator indicates that aging is disabled for the table search request even if an aging configuration indicator value of the search table storing the at least one of the entries indicates that aging is enabled.

20. The table aging module of claim 19, further comprising aging memory tiles apportioned into age mark memory and age mask memory.

21. The table aging module of claim 20, further comprising means for performing an age marking process using an input queue for buffering age marking inputs for table hits to the aging memory tiles.

22. The table aging module of claim 21, further comprising means for performing an age refreshing process including a bit-wise OR operation of a read-out age mark data in the age mark memory with the inverse of a mask bit in the age mask memory.

23. The table aging module of claim 22, further comprising an age interrupt queue.

24. The table aging module of claim 23, wherein when a result of the bit-wise OR operation is not all a same value, further comprising means for pushing the result and memory tile address and row address for an aging memory row that corresponds to a set of the entries, into the age interrupt queue.

25. The table aging module of claim 24, further comprising a refresh state machine for controlling the age refreshing process.

26. The table aging module of claim 25, further comprising means for examining all age memory bits corresponding to the plurality of search tables.

27. The table aging module of claim 26, wherein the examination occurs periodically based on a configured cycle time or is specifically triggered by software.

28. The table aging module of claim 27, wherein when an age memory bit is unmarked, software is notified that a respective table entry is stale, and when the age memory bit is marked, the age memory bit is reset as unmarked in preparation for next round of age marking and age refreshing.

29. The table aging module of claim 28, further comprising means for identifying both the mask bit value of one or more of the entries and the aging configuration indicator value of the search table storing the one or more of the entries.

30. The table aging module of claim 29, wherein the means for refraining, based on both the aging configuration indicator value of the search table storing the one or more of the entries and the mask bit values of the one or more of the entries, refrains from aging the one or more of the entries, regardless of the age memory bit values of the one or more entries, if the aging configuration indicator value of the search table storing the one or more of the entries indicates that the search table storing the one or more of the entries should be aged, but the mask bit values indicate that the one or more of the entries should not be aged.

31. A non-transitory computer-readable medium storing a table aging element, the table aging element including both mask bit values and an age memory bit value for each entry of each of a plurality of search tables in a central aging memory pool, wherein each of the age memory bit values indicate whether a corresponding one of the entries has been subject to a search hit since a previous aging process, wherein the table aging element,
   determines if a request aging indicator of a table search request indicates that aging is disabled for the table search request, wherein at least one of the entries is hit by the table search request;
   refrains from updating the age memory bit values of the at least one of the entries when the request aging indicator indicates that aging is disabled for the table search request even if an aging configuration indicator value of the search table storing the at least one of the entries indicates that aging is enabled;
   identifies both the mask bit value of one or more of the entries and the aging configuration indicator value of the search table storing the one or more of the entries; and
   based on both the aging configuration indicator value of the search table storing the one or more of the entries and the mask bit values of the one or more of the entries, refrains from aging the one or more of the entries, regardless of the age memory bit values of the one or more entries, if the aging configuration indicator value of the search table storing the one or more of the entries indicates that the search table storing the one or more of the entries should be aged, but the mask bit values indicate that the one or more of the entries should not be aged.

* * * * *